United States Patent
Sinha et al.

(10) Patent No.: US 8,694,624 B2
(45) Date of Patent: Apr. 8, 2014

(54) SYSTEMS AND METHODS FOR CONCURRENT WIRELESS LOCAL AREA NETWORK ACCESS AND SENSING

(75) Inventors: Amit Sinha, Marlborough, MA (US);
Glen Crowder, Cumming, GA (US);
Todd Nightingale, Atlanta, GA (US);
Michael Yuen, Waltham, MA (US)

(73) Assignee: Symbol Technologies, Inc., Holtsville, NY (US)

( * ) Notice: Subject to any disclaimer, the term of this patent is extended or adjusted under 35 U.S.C. 154(b) by 956 days.

(21) Appl. No.: 12/468,164

(22) Filed: May 19, 2009

(65) Prior Publication Data
US 2010/0296496 A1 Nov. 25, 2010

(51) Int. Cl.
*G06F 15/173* (2006.01)

(52) U.S. Cl.
USPC ............... 709/224; 709/225; 709/226

(58) Field of Classification Search
USPC .......................... 709/224, 225, 226
See application file for complete search history.

(56) References Cited

U.S. PATENT DOCUMENTS

| | | | |
|---|---|---|---|
| 5,231,634 A | 7/1993 | Giles et al. | |
| 5,339,316 A | 8/1994 | Diepstraten | |
| 5,745,483 A | 4/1998 | Nakagawa et al. | |
| 5,875,179 A | 2/1999 | Tikalsky | |
| 5,978,919 A * | 11/1999 | Doi et al. | 726/36 |
| 5,982,762 A * | 11/1999 | Anzai et al. | 370/338 |
| 6,067,297 A | 5/2000 | Beach | |
| 6,292,508 B1 | 9/2001 | Hong et al. | |
| 6,345,043 B1 * | 2/2002 | Hsu | 370/324 |
| 6,411,608 B2 | 6/2002 | Sharony | |
| 6,453,345 B2 | 9/2002 | Trcka et al. | |
| 6,466,608 B1 | 10/2002 | Hong et al. | |
| 6,487,666 B1 | 11/2002 | Shanklin et al. | |
| 6,539,207 B1 | 3/2003 | del Castillo et al. | |
| 6,674,738 B1 | 1/2004 | Yildiz et al. | |
| 6,754,488 B1 * | 6/2004 | Won et al. | 455/424 |
| 6,910,135 B1 | 6/2005 | Grainger | |
| 6,934,298 B2 | 8/2005 | Bentley | |
| 6,957,067 B1 | 10/2005 | Iyer et al. | |
| 7,002,943 B2 | 2/2006 | Bhagwat et al. | |
| 7,017,186 B2 | 3/2006 | Day | |

(Continued)

FOREIGN PATENT DOCUMENTS

| | | | |
|---|---|---|---|
| JP | 2002091683 | * | 5/2002 |
| JP | 2005045330 | * | 7/2003 |

(Continued)

OTHER PUBLICATIONS

International Search Report and Written Opinion for International Application No. PCT/US2010/033812 mailed on Jul. 16, 2010.

(Continued)

*Primary Examiner* — Karen Tang

(57) ABSTRACT

This invention describes systems and methods for combining the Wireless Local Area Network (WLAN) infrastructure and Wireless Intrusion Prevention Systems (WIPS) by leveraging a common radio platform equipped with more than one WLAN radio and a unified management system. The invention provides all the benefits of the WLAN, without sacrificing the 24×7 dedicated security monitoring and performance troubleshooting available from an overlay WIPS system, while reducing the deployment cost and management complexity, by sharing a common hardware platform for the WLAN Access Point (AP) and WIPS sensor and leveraging an integrated management system.

20 Claims, 6 Drawing Sheets

(56) References Cited

U.S. PATENT DOCUMENTS

| | | | |
|---|---|---|---|
| 7,042,852 B2 * | 5/2006 | Hrastar | 370/310 |
| 7,058,796 B2 | 6/2006 | Lynn et al. | |
| 7,069,024 B2 | 6/2006 | Sharony | |
| 7,086,089 B2 | 8/2006 | Hrastar et al. | |
| 7,130,289 B2 | 10/2006 | Kuan et al. | |
| 7,140,040 B2 | 11/2006 | McBrearty et al. | |
| 7,154,874 B2 | 12/2006 | Bhagwat et al. | |
| 7,194,004 B1 | 3/2007 | Thomsen | |
| 7,216,365 B2 | 5/2007 | Bhagwat et al. | |
| 7,224,678 B2 | 5/2007 | Billhartz | |
| 7,236,460 B2 | 6/2007 | Wu et al. | |
| 7,237,267 B2 | 6/2007 | Rayes et al. | |
| 7,248,856 B2 | 7/2007 | Wang | |
| 7,257,099 B2 * | 8/2007 | Myojo | 370/329 |
| 7,257,107 B2 | 8/2007 | Swier, Jr. et al. | |
| 7,277,404 B2 | 10/2007 | Tanzella et al. | |
| 7,286,515 B2 | 10/2007 | Olson et al. | |
| 7,289,465 B2 | 10/2007 | Kuan et al. | |
| 7,292,562 B2 | 11/2007 | Wu et al. | |
| 7,295,524 B1 | 11/2007 | Gray et al. | |
| 7,295,831 B2 | 11/2007 | Coleman et al. | |
| 7,317,914 B2 | 1/2008 | Adya et al. | |
| 7,322,044 B2 | 1/2008 | Hrastar | |
| 7,324,804 B2 | 1/2008 | Hrastar et al. | |
| 7,327,690 B2 | 2/2008 | Billhartz | |
| 7,327,697 B1 | 2/2008 | Calhoun et al. | |
| 7,333,481 B1 | 2/2008 | Rawat et al. | |
| 7,333,800 B1 | 2/2008 | Gopinath | |
| 7,336,670 B1 | 2/2008 | Calhoun et al. | |
| 7,339,914 B2 | 3/2008 | Bhagwat et al. | |
| 7,340,247 B1 | 3/2008 | O'Hara, Jr. et al. | |
| 7,340,768 B2 | 3/2008 | Rosenberger | |
| 7,342,906 B1 | 3/2008 | Calhoun et al. | |
| 7,346,338 B1 | 3/2008 | Calhoun et al. | |
| 7,355,996 B2 | 4/2008 | Hrastar | |
| 7,359,676 B2 * | 4/2008 | Hrastar | 455/67.11 |
| 7,370,362 B2 | 5/2008 | Olson et al. | |
| 7,383,577 B2 | 6/2008 | Hrastar et al. | |
| 7,385,948 B2 | 6/2008 | Kuan et al. | |
| 7,856,656 B1 * | 12/2010 | Kharvandikar et al. | 726/3 |
| 2001/0039579 A1 | 11/2001 | Trcka et al. | |
| 2002/0060995 A1 | 5/2002 | Cervello et al. | |
| 2002/0061031 A1 | 5/2002 | Sugar et al. | |
| 2002/0066034 A1 | 5/2002 | Schlossberg et al. | |
| 2002/0087882 A1 | 7/2002 | Schneler et al. | |
| 2002/0176437 A1 | 11/2002 | Busch et al. | |
| 2002/0181417 A1 | 12/2002 | Malhotra et al. | |
| 2003/0063592 A1 | 4/2003 | Seki et al. | |
| 2003/0084319 A1 | 5/2003 | Tarquini et al. | |
| 2003/0084323 A1 * | 5/2003 | Gales | 713/200 |
| 2003/0117985 A1 | 6/2003 | Fujii et al. | |
| 2003/0117986 A1 | 6/2003 | Thermond et al. | |
| 2003/0135762 A1 * | 7/2003 | Macaulay | 713/201 |
| 2003/0148767 A1 * | 8/2003 | Sugaya et al. | 455/450 |
| 2003/0149888 A1 | 8/2003 | Yadav | |
| 2003/0174680 A1 | 9/2003 | Kuan et al. | |
| 2003/0185244 A1 | 10/2003 | Wu et al. | |
| 2003/0189908 A1 | 10/2003 | Kuan et al. | |
| 2003/0192055 A1 | 10/2003 | Acki et al. | |
| 2003/0200455 A1 | 10/2003 | Wu | |
| 2003/0204632 A1 | 10/2003 | Willebeek-LeMair et al. | |
| 2003/0217289 A1 * | 11/2003 | Ammon et al. | 713/201 |
| 2003/0221006 A1 | 11/2003 | Kuan et al. | |
| 2003/0224797 A1 | 12/2003 | Kuan et al. | |
| 2004/0003285 A1 | 1/2004 | Whelan et al. | |
| 2004/0098610 A1 * | 5/2004 | Hrastar | 713/200 |
| 2004/0103307 A1 | 5/2004 | Raphaeli et al. | |
| 2004/0107219 A1 | 6/2004 | Rosenberger | |
| 2004/0136318 A1 | 7/2004 | Bentley | |
| 2004/0162995 A1 | 8/2004 | Muaddi et al. | |
| 2004/0209634 A1 * | 10/2004 | Hrastar | 455/515 |
| 2005/0030929 A1 * | 2/2005 | Swier et al. | 370/338 |
| 2005/0195753 A1 * | 9/2005 | Chaskar et al. | 370/254 |
| 2005/0213553 A1 | 9/2005 | Want | |
| 2006/0123133 A1 * | 6/2006 | Hrastar | 709/238 |
| 2006/0150250 A1 | 7/2006 | Lee et al. | |
| 2006/0193300 A1 | 8/2006 | Rawat et al. | |
| 2007/0002736 A1 | 1/2007 | Gade et al. | |
| 2007/0025313 A1 | 2/2007 | Bhagwat et al. | |
| 2007/0036091 A1 | 2/2007 | Kuan et al. | |
| 2007/0094741 A1 * | 4/2007 | Lynn et al. | 726/26 |
| 2007/0171885 A1 | 7/2007 | Bhagwat et al. | |
| 2007/0189249 A1 * | 8/2007 | Gurevich et al. | 370/338 |
| 2007/0217371 A1 * | 9/2007 | Sinha | 370/338 |
| 2007/0286143 A1 | 12/2007 | Olson et al. | |
| 2008/0109879 A1 | 5/2008 | Bhagwat et al. | |
| 2008/0119130 A1 | 5/2008 | Sinha | |
| 2008/0143512 A1 * | 6/2008 | Wakisaka et al. | 340/504 |

FOREIGN PATENT DOCUMENTS

| | | |
|---|---|---|
| WO | WO9859428 A1 | 12/1998 |
| WO | WO0143467 A1 | 6/2001 |
| WO | WO03085544 A1 | 6/2003 |
| WO | WO03084255 A1 | 9/2003 |
| WO | WO03088547 A2 | 10/2003 |

OTHER PUBLICATIONS

International Preliminary Report on Patentability for International Application No. PCT/US2010/033812 mailed on Nov. 22, 2011.
"Motorola Wireless Solutions Win GCN Best of FOSE Awards", Press Release, Mar. 19, 2009, pp. 1-3.
Josh Wright, "A Closer Look at Wireless Intrusion Detection", Aruba Networks White Paper, Feb. 2007, pp. 1-11.
Extreme Networks, "New FCC DFS2 Ruling Affects Operation of WLAN Equipment in the 5 GHz Spectrum. Software Update may be Required", Extreme Networks, Jun. 19, 2007, pp. 1-3.

* cited by examiner

SYSTEMS AND METHODS FOR CONCURRENT WIRELESS LOCAL AREA NETWORK ACCESS AND SENSING

FIELD OF THE INVENTION

The present invention relates generally to wireless networking. More particularly, the present invention relates to systems and methods for concurrent wireless local area network (WLAN) access and sensing, such as, for example combining functionality of wireless access points (APs) and wireless intrusion prevention/detection in a single device.

BACKGROUND OF THE INVENTION

Wireless technology is growing in popularity. Businesses are not only migrating to wireless networking, they are steadily integrating wireless technology and associated components into their wired infrastructure. The demand for Wireless Local Area Networks (WLANs) is fueled by the growth of mobile computing devices, such as laptops and personal digital assistants and a desire by users for continual connections to the network without having to "plug in." WLAN networks are defined by various IEEE specifications, such as IEEE 802.11 protocols. Because WLAN networks are open through radio frequency (RF) transmission, there is a recognized need for wireless security and for an associated system to provide security, such as a Wireless Intrusion Prevention System (WIPS), a Wireless Intrusion Detection Systems (WIDS), and the like.

Traditionally, dedicated wireless security systems (e.g., WIPS, WIDS, etc.) have been overlaid on top of a WLAN infrastructure to provide security monitoring, policy enforcement, and remote troubleshooting capabilities. By overlaid, the wireless security system is separate from the WLAN infrastructure. A dedicated wireless security system typically includes distributed wireless sensors that scan channels passively and report their events and statistics to a central server. The server analyzes information from the sensors and generates alarms in response to attacks, events, and policy violations. The server also provides a centralized mechanism to administer and configure the remote sensors as well as provide a central repository for historical wireless data.

The advantage of an overlaid wireless security system that it provides superior visibility across the RF band as well as enhanced security due to the fact that it is scanning for and responding to threats on a 24×7 basis. Further, decoupling the WIPS from the WLAN infrastructure allows for a WLAN vendor agnostic monitoring solution. Relying on infrastructure Access Points (AP) for wireless sensor data typically results in reduced visibility on channels that the AP is not operating on. Security performance degrades as the load on the AP is increased. However, the disadvantage of the overlaid model is a higher cost associated with deploying and managing two separate systems—the WLAN infrastructure and an overlaid security system. It would be advantageous to combine wireless security functionality with WLAN infrastructure while avoiding the performance issues and limitations with the integrated solution.

BRIEF SUMMARY OF THE INVENTION

In various exemplary embodiments, the present invention relates to systems and methods for concurrent wireless local area network (WLAN) access and sensing, such as, for example combining functionality of wireless access points (APs) and wireless intrusion prevention/detection in a single device. The present invention combines WLAN infrastructure and wireless security without sacrificing the 24×7 dedicated security and performance monitoring available from the overlaid systems while reducing the deployment cost by sharing common hardware platforms for APs and sensors. The present invention includes a common radio platform equipped with more than one WLAN radio and a unified management system.

BRIEF DESCRIPTION OF THE DRAWINGS

The present invention is illustrated and described herein with reference to the various drawings, in which like reference numbers denote like method steps and/or system components, respectively, and in which.

DETAILED DESCRIPTION OF THE INVENTION

Figure 1:
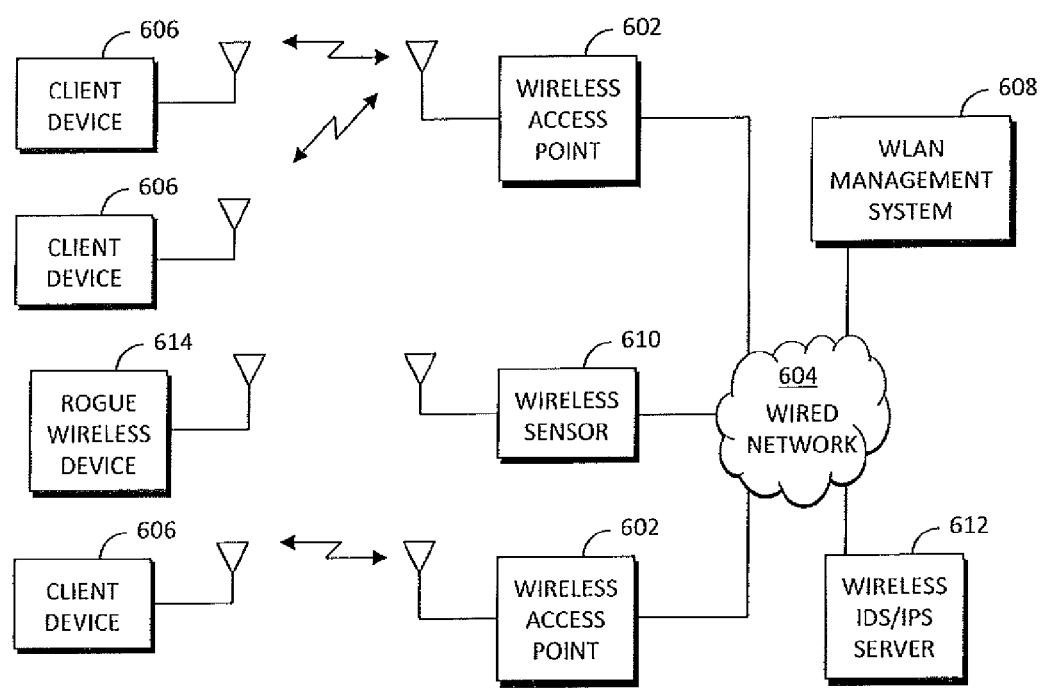
FIG. 1 is a network diagram of a typical model for an overlaid wireless security system on top of existing WLAN infrastructure.

In various exemplary embodiments, the present invention relates to systems and methods for concurrent wireless local area network (WLAN) access and sensing, such as, for example combining functionality of wireless access points (APs) and wireless intrusion prevention/detection in a single device. The present invention combines WLAN infrastructure and wireless security without sacrificing the 24×7 dedicated security and performance monitoring available from the overlaid systems while reducing the deployment cost by sharing common hardware platforms for APs and sensors. The present invention includes a common radio platform equipped with more than one WLAN radio and a unified management system.

A network including both wired and wireless components includes a variety of connected systems such as network accessible data storage servers, local servers, and local clients. The data storage servers, local servers, and local clients are connected through an Ethernet connection. A router connects the Ethernet and the components, to an external network, such as the Internet. A firewall can be included to protect the wired local network and act as a security gate to prevent unauthorized traffic coming from the network 120 such as a potential hacker. The firewall can effectively deter an attack from a wired hacker via the network. By installing wireless access points (AP) to the wired network (e.g., Ethernet and router), personal computers and laptops equipped with wireless local area network (WLAN) cards and other wireless-enabled devices create a wireless network that can connect to the wired network at broadband speeds (i.e., 11 Mb/s up to 600 Mb/s) using IEEE 802.11a/b/g/n protocols, for example.

Wireless networks operate over the airspace which is an uncontrolled and shared medium lacking the equivalent physical control and accessibility of its wired counterpart. As such, wireless hackers can enter the local network through the access points even if the access points are located behind the firewall. Therefore, wireless networks (in conjunction with access points) can provide opportunities for unauthorized users to attack the network, which can include in various examples: a local area network, a wide area network, a metropolitan area network, a corporate intranet, among many others. Also, a wireless AP can be installed unbeknownst to an enterprise (e.g., rogue AP) or it can be installed and misconfigured (e.g. misconfigured AP without proper security settings). As such, the AP can also provide opportunities for unauthorized users to access the network. Due to the low cost of APs, anyone with access to an enterprise can install a rogue AP and connect it to the Ethernet network providing complete wireless access to the enterprise. A misconfigured AP can have the wrong encryption settings allowing any user to gain access to the enterprise.

Also, municipal wireless networks are proliferating such as local governments providing free or reduced cost IEEE 802.11 access. These networks can be used by the wireless hacker to gain access to a device on the enterprise's wireless network which is set to allow inbound connections effectively bypassing the enterprise firewall and content filtering. Additionally, mobile users face threats from evil twin APs which gain access to the user's login credentials by posing as a legitimate AP. Such a threat can allow the evil twin AP to relay the credentials to a hacker for access to the enterprise's wireless network. In addition to IEEE 802.11 access, other wireless protocols such as Bluetooth, WiMax, and cellular data are emerging and proliferating. Bluetooth is deployed within the enterprise with PDA, cellular phones, and the like. WiMax is a wireless standard for the delivery of last mile wireless broadband access as an alternative to cable and DSL.

The network can be configured with wireless sensors and a server for monitoring, detecting, and preventing wireless intrusions on the wireless networks. The sensors can connect to the Ethernet network or over the wireless networks for wireless backhaul, and each sensor is located to monitor, detect, and prevent intrusions over a pre-defined area for wireless activity. The sensors, are configured to monitor data transmitted on the wireless networks and to communicate relevant data, events, and statistics to the server. The sensors can be configured to monitor one or more wireless channels such as IEEE 802.11 standard channels and non-standard user-defined channels. The sensors can monitor more than one channel simultaneously if the sensors are configured with multiple wireless radios. The sensors can include a local processor to perform data analysis on wireless events to minimize communications to the server.

The server connects to the Ethernet or optionally through the network (not shown) and the server is configured to receive and correlate data, events, and statistics from the sensors. Further, multiple servers can operate to provide redundancy and load-balancing. Additionally in some examples, access points and/or local clients can occasionally operate as sensors to communicate data, events, and statistics to the server. Also, local clients equipped with WLAN cards can be configured with software agents, allowing the local clients to periodically monitor the wireless networks and to communicate data, events, and statistics from monitoring the wireless networks to the server.

The server can be configured to detect attacks and events, network performance degradation, network policy compliance on the wireless networks, and the like. Further, the server can be configured to direct the sensors to terminate a rogue wireless client (e.g. an unauthorized user) such as wireless hackers through various mechanisms, such as 1) transmitting a signal via a wireless transmitter to jam communications targeted at the potentially compromised AP; 2) transmitting a signal via the wireless transmitter to corrupt communications targeted at the potentially compromised AP by introducing CRC errors; 3) transmitting a signal via the wireless transmitter to increase difficulty associated with breaking of encryption associated with the wireless networks and the potentially compromised AP, wherein the signal includes packets emulating legitimate traffic but with randomized payloads; or 4) transmitting a channel change request communication via the wireless transmitter to the potentially compromised AP. Also, the server can include a data store to log history and trends relating to monitoring of the wireless network. The combination of the server and sensors is known as a wireless intrusion prevention system (WIPS) or a wireless intrusion detection system (WIDS).

The wireless security system includes a server connected through a network to a plurality of distributed sensing/access devices including wireless sensors, WLAN clients, APs, and combined APs/sensors. The network can include wired and wireless components and can be geographically diverse with the plurality of distributed sensing/access devices distributed throughout the diverse geography. Each of the wireless sensors, WLAN clients, APs, and combined APs/sensors is configured to monitor wireless traffic transmitted on the wireless network and to provide this monitored data to the server. For example, this can include stripping overhead data and providing this data to the server. The sensors are positioned at locations to monitor wireless traffic over the network. The sensors are overlaid or standalone devices configured to passively monitor wireless activity and to relay the monitored data to the server. Additionally, the sensors can be configured to terminate wireless devices and the like. The sensors are accordingly proximate to multiples APs, wireless clients, and the like.

The wireless security system can include WLAN clients that are generally wireless devices configured with a software agent that enables the wireless device to passively monitor the wireless network periodically, such as when the wireless device is idle. For example, the WLAN clients can include computers with WLAN cards or the like. Here, the computer can provide monitoring while idle and forward the monitored data to the server. Typically, wireless devices significantly outnumber the quantity of sensors and APs by several orders of magnitude. Advantageously, the sheer quantity of the WLAN clients can provide significant monitoring coverage of the wireless network without requiring additional hardware since the WLAN client is a software agent that can be installed on an enterprise's computers.

The wireless network includes the APs to allow wireless communication devices to connect to a wireless network using Wi-Fi (IEEE 802.11), Bluetooth or related standards. The APs can connect to the network through a wired or a wireless connection. Typically, the APs include one or more radios operating on one or more wireless channels to provide wireless access. Existing APs can provide dual access and sensing functionality on a periodic basis, such as monitoring off channels with an extra radio or monitoring while not providing access to the wireless network. However, the sensing functionality of the APs is not available full time and also suffers desensitization from the access radio. Also, typical APs include band locked radios.

In various exemplary embodiments, the present invention provides a combined AP/sensor device to provide both access and monitoring of the wireless network. This AP/sensor includes multiple radios configured to provide both access and sensing functionality with corresponding connections to the server and to the network. The AP/sensor provides all the benefits of WLAN infrastructure, without sacrificing the full time dedicated security monitoring and performance troubleshooting available from an overlaid security system, while reducing the deployment cost and management complexity, by sharing a common hardware platform for the WLAN Access Point (AP) and sensor and leveraging an integrated management system.

The server includes a core and a data store. The core generally includes a processing element and interfaces to the network. The core is configured to receive data from the sensors, the WLAN clients, the APs, and the AP/Sensors, to analyze the data, and to store the data in the data store. In an exemplary embodiment, the core can apply multiple intrusion detection tests to received data to detect possible intrusions or violations. These intrusion detection tests can relate to wireless policy deviation, statistical anomalies, signature-based attacks, wireless protocol usage, and the like.

The server can be accessed through a user interface locally or remotely through a remote browser interface. Specifically, the server can include a Graphical User Interface (GUI) to display network topology, alarms and warnings, network performance, and the like. The GUI can also be utilized to configure the server and the sensors, the WLAN clients, the APs, and the AP/Sensors. In the present invention, the UI and interface can provide a single point of control for both WLAN infrastructure management and wireless security management.

In an exemplary embodiment, the intrusion detection system (IDS) can operate with the server and the wireless sensors, WLAN clients, APs, and combined APs/sensors, i.e. each of these components can make up a part of the IDS. In the exemplary IDS process, all monitored traffic, i.e. packets, pass through four detections systems: signature-based testing, protocol-based testing, anomaly-based testing, and policy deviation-based testing; other embodiments can use one or more of these tests, or other tests, in varying combinations.

Initially, configuration information is received, typically including network default data and risk criteria. This information can be retrieved from a file (e.g., from the data store, derived or obtained from monitoring the network and/or entered interactively at the outset of the IDS process. The system reads or receives frames from the wireless network. The received frames are interrogated as follows. The information within the frame is interrogated to determine if a known attack signature has been identified. Signatures encode datalink layer attack patters as combinations of packet sequences and state. For example, active probing emits a pattern or sequence of network requests. This sequence can be recognized by its packet sequence signature. If the attack signature is identified, the intrusion detection system signals an alarm manager to deliver an alert to the administrator.

If no attack signature is identified, the frame information is passed through a protocol violation engine to determine if the protocol used in the frame is authorized. Protocol analysis examines whether or not protocol usage is legitimate. For example, emitting a large number of association or disassociation requests in a short interval is not a legitimate use of the protocol. Other protocol violations are also contemplated. The protocol violations can be defined by a network administrator, determined by the IDS based upon historical statistics for the given network, and the like. If the protocol used in the frame is outside of the authorized protocol set, the intrusion detection system signals an alarm manager to deliver an alert to the administrator.

If the protocol test passes, the IDS checks the frame data for statistical anomalies against the data store, or a statistics database maintained therein. Anomaly based detection computes such values as the mean, non-zero mean, standard deviation, autocorrelation and peak for each time slice throughout the day. This can be used to create a normalized statistics database for each time slice and user. Current activity is then monitored and compared with the recorded statistics vector. If the difference is larger than a configurable threshold, an alert is generated. Instead of, or in addition to, this approach, a Bayes test can be applied to deduce the probability that the current statistics vector is an attack as opposed to a legitimate sequence. If an anomaly exists, the intrusion detection system signals an alarm manager to deliver an alert to the administrator.

If no anomaly is detected, the system interrogates the frame to determine if a pre-defined policy has been violated. Policy testing compares the observed activity with a configurable set of activity rules stored in the data store. For example, a rule can declare that only specific hosts with specific addresses and specific network cards can access the network. Another rule can declare that wireless activity is only allowed at specific times. Alternatively, another rule can require a specific encryption setting or the like. Generally, the policy rules can include any configurable setting or use associated with the wireless network. If a pre-defined policy has been violated, the intrusion detection system signals an alarm manager to deliver an alert to the administrator.

The tests outlined above can be performed serially. In other embodiments, one or more of these tests can occur in parallel. Further, subsequent tests only occur if a prior test was passed. In a further preferred embodiment, all tests occur irrespective of the outcome of a prior test; consequently, a single read frame could potentially generate an alarm for every test performed on it. Additionally, other tests can be included in the IDS process.

A modified and enhance version of the IDS process is used where network traffic is monitored from multiple devices Firstly, configuration information is received. As before, this is typically done through reading system configuration files, monitoring the network and/or interactive entry at the outset of the process. This information typically includes network default data and risk criteria such as access point configuration data (MAC Address of the access point, Access Point Name, etc.), station configuration data and various thresholds values.

A wireless packet frame is received from each input device (e.g., the wireless sensors, WLAN clients, APs, and combined APs/sensors). Frames are read so that the frame content can be interrogated. Each read frame is interrogated by a multi-dimensional intrusion detection system (IDS) such as detailed above, and the outputs of all IDS tests are then compared and a confidence level computed. As with the process above, other tests in either alone, in combination with each other or in combination with one or more of those described above may be used in other embodiments.

In the case where only a statistical anomaly is detected, it is flagged as a lower level performance alert. In the case where, in addition to the statistical anomaly, one of the other violations has been detected, the alarm is elevated to an intrusion alarm and an alarm manger is alerted. Other embodiments do not rely on aggregate test outcome but determine alarm status on single test outcomes. Further, some embodiments can use other test types and outcome combinations to determine type and severity of alarms generated.

If an alarm is not detected, a test to see if a predetermined interval for gathering statistics has been reached occurs. If the end of the pre-configured statistics gathering interval has occurred, the data store is updated to reflect the statistics gathered from the received frames over the interval. Statistics are gathered by monitoring traffic between network nodes, minute-by-minute statistics about BSS frame types and traffic volumes, summaries of transmission statistics for all stations associated with access points, current-minute transmission statistics for all Stations, and detailed minute-by-minute transmission statistics for any individual station in the wireless computer network.

Data fusion occurs on a batch basis by aggregating data from multiple databases. The process integrates statistical data from multiple databases that is generated through frame monitoring and intrusion detection engines. This approach provides a methodology for managing data received from input devices such as the wireless sensors, WLAN clients, APs, and combined APs/sensors deployed at multiple sites and for aggregating enterprise data at a single central system such as the server. The Attack and Station Profile database is read at step to begin a processing loop to integrate databases from separate sources. Correlation and pattern recognition is performed at step to update the attack and station profiles in step. The processing loop then sleeps at step until the next processing loop interval is to take place based on the pre-configured time interval or trigger.

After the alarm manager is signaled, the attack and station profile database is read; in this step, existing attacks are queried and existing station security state is queried. This data is compared to the newly generated alarm. If it is sufficiently similar, no new external notification occurs. If it is not, a new notification message is generated and console display and/or external messaging of the alarm occurs.

In some embodiments, this process can be executed by the wireless sensors, WLAN clients, APs, and combined APs/sensors. The physical hardware powers up and loads the operating system (such as Real-Time Linux or RTOS) to an operational state. The first-time execution of the sensor process after power up, a timer is initialized for management and control frames buffering. The timer allows the management and control frames to be buffered until the timer reaches a predetermined elapsed time, at which point they are forwarded to the server or peer for processing or processed locally. Although other embodiments can forward unbuffered management and control frames and therefore do not require a timer, or any process steps involving the timer.

A wireless packet frame is then read from the wireless network. Frames are read so that the frame content can be interrogated in down-stream processes. This is also the entry point in the process for retrieving the next frame after interrogation of the present frame. The packet frame read off the wireless network is interrogated to determine if the frame is of a redundant type such as management or control frames. If the frame is of a redundant type, processing continues. Further interrogation of a management or control frame is performed to determine whether the frame is a redundant type frame (i.e., Beacon Frame). If not, control passes back to entry point. Management and control frames such as beacon frames can be buffered as one record with a frame count and to reduce the traffic on the network as frames are transmitted to the server or to a peer or to reduce overhead of local processing. The buffering can be accomplished by maintaining a frame count for the particular type of redundant frame and populating an appropriate data structure based upon the redundant frame type. If an appropriate time interval has elapsed or if a particular time has been reached, or if no buffering is intended, processing proceeds for forwarding of the redundant frame information to the central server or peer or for local processing depending upon the particular embodiment. If the timer does not trigger transmission or processing, processing continues.

If the frame is not of a redundant type, processing continues where the header data is stripped from the wireless packet frame. The header data is used to get origin/destination data as well as for maintaining state. A data structure is populated with pertinent information concerning wireless station state and protocol activity as well as origin and destination information for later down-line processing by a backend analysis server, by a peer or a local processor. Once data is accumulated and preprocessed by the remote sensor, the resulting data structures are passed back to the central server or a peer over IP or locally processed for intrusion detection analysis. The process continues with the retrieval of the next frame.

The embodiment of a combination hardware sensor and access point, one 802.11 radio operates as a normal 802.11 access point operating in infrastructure mode that allows wireless stations to associate and pass data through to the wired network. The additional 802.11 radio operates in promiscuous mode just as a stand-alone hardware sensor operates. This gives the device the ability to send and receive data as a normal 802.11 access point while utilizing the additional radio to monitor the airwaves against intrusions and monitor the wireless network for performance and health monitoring.

Referring to FIG. 1, a network diagram illustrates a typical model for an overlaid wireless security system on top of existing WLAN infrastructure. The existing WLAN infrastructure includes wireless access points 602 distributed throughout a diverse geography. The access points 602 can be interconnected through a network 604, e.g. the access points 602 can connect to the network 604 through a wired connection (i.e., Ethernet) or through a wireless backhaul connection. In normal operation, client devices 606 associate and communicate with and through the access points 602. Further, the existing WLAN infrastructure can include a WLAN management system 608 connected through the network 604 to the various access points 602. Generally, the WLAN management system 608 can provide management and control of the wireless network including setup, monitoring, troubleshooting, and the like.

The overlaid wireless security system can include a WIDS and/or WIPS system with distributed sensors 610 deployed in proximity of the distributed access points 602. The sensors 610 communicate with a WIPS/WIDS server 612 using the network 604 similar to the APs 602 communicating with wireless switches, controllers and the WLAN management system 608. Note that there is no requirement for common hardware between the AP 602 and the sensor 610 in this overlaid architecture. As long as the sensors 610 and APs 602 are IEEE 802.11 standards-based, the system is interoperable. The sensors 610 are configured to monitor, detect, and prevent a rogue wireless device 614 from accessing the wireless network.

Figure 2:
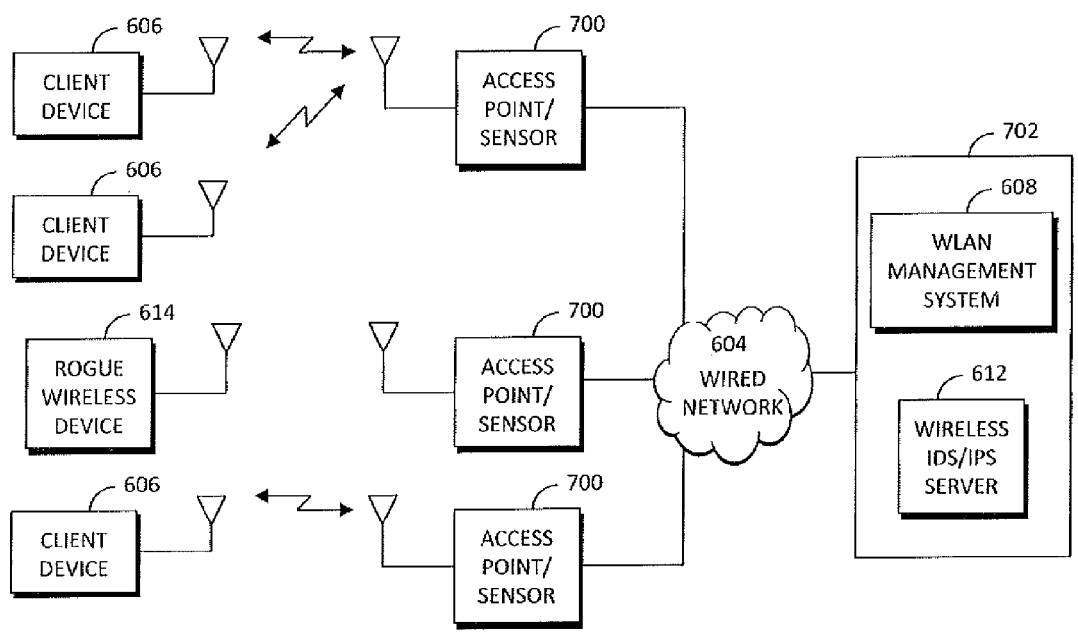
FIG. 2 is a network diagram of a deployment of AP/sensor devices in a combined wireless security/WLAN infrastructure system

Referring to FIG. 2, a network diagram illustrates a deployment of AP/sensor devices 700 in a combined wireless security/WLAN infrastructure system according to an exemplary embodiment of the present invention. The AP/sensor devices 700 include both access functionality (i.e., AP) and sensing functionality (i.e., sensor), and generally include two or more wireless radio units configured to provide the access and sensing functionality. The AP/sensor devices 700 are deployed based on cover and capacity requirements for a given area, and they remove the requirement to deploy overlaid sensor devices. Additionally, the AP/sensor devices 700 can also be deployed in conjunction with access points 602 and overlaid sensors 604 if required.

The present invention includes a single management platform 702 configured to provide the functionality of the WLAN management system 608 and the WIPS/WIDS server 612. The AP/sensor devices 700 are configured and controlled by the single management platform 702. The single management platform 702 can include one or more servers configured to provide a single interface to manage the WLAN infrastructure and the WIDS/WIPS functionality in the WLAN infrastructure.

Based on data and security sensing requirements, a subset of the AP/sensor units can enable sensing function on their radios. Accordingly, the AP and sensor portions of the AP/sensor devices 700 cooperate to improve performance. Specifically, the AP/sensor devices 700 include a cooperation algorithm that enables combined access and sensing functionality in collocated radios thereby avoiding performance issues associated with collocated radio units. In one exemplary aspect of the cooperation algorithm, each AP/sensor device 700 can be configured with an allocation of AP functionality and sensing functionality that is either fixed, on-demand, or adaptive. For example, more of the AP/sensor devices 700 can be dedicated to the access function during periods of high usage or load and more AP/sensor devices 700 can be dedicated to security when the data usage or load is low (e.g., off hours) when security monitoring is more important.

In another exemplary aspect of the cooperation algorithm, radios in the AP/sensor device 700 associated with the sensor and AP functions are coordinated to minimize the impact of mutual radio desensitization when one radio is transmitting and the other is receiving a frame on a channel that is in close frequency proximity. APs typically transmit much more frequently than sensors. When the AP is transmitting on a given channel, the sensor radio can be desensitized by the high powered transit signal emanating in close proximity to the sensors radio. The desensitization progressively reduces as the frequency separation between the two radios is increased. By adaptively adjusting the frequency scanning pattern to avoid AP channel proximity, while the AP is transmitting, the sensor can minimize the loss of frame reception. Similarly, when the sensor is transmitting (e.g., during a wireless termination), the AP may attempt to synchronize its transmissions at the same time as the sensor to avoid transmit-receive desensitization.

Figure 3:
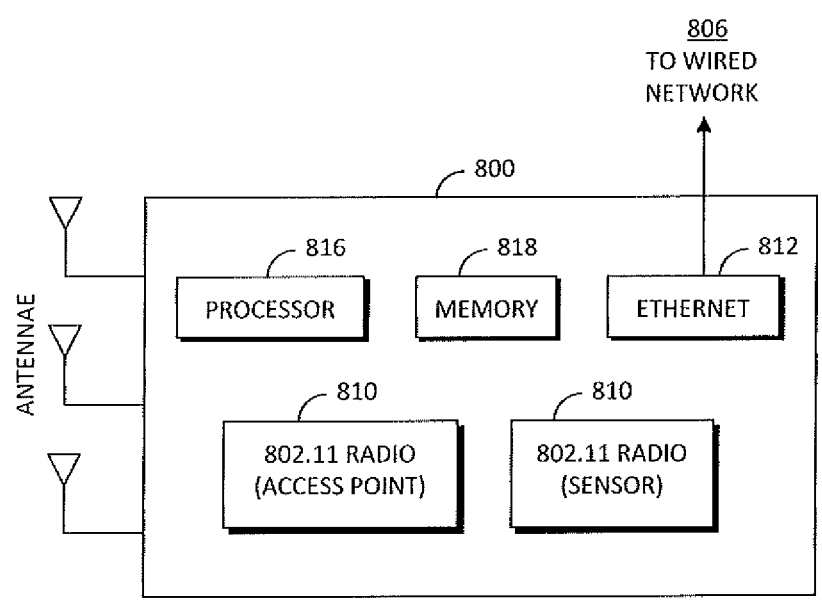
FIG. 3 is an AP/sensor device with combined access and sensing functionality utilizing a wired backhaul.
Figure 4:
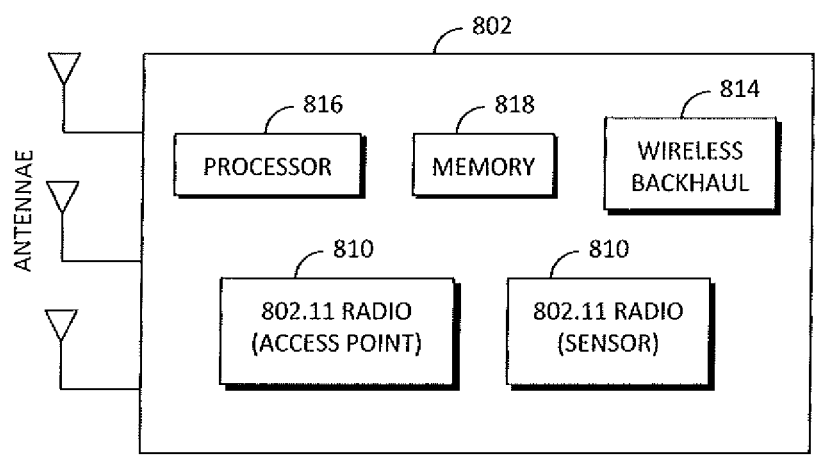
FIG. 4 is an AP/sensor device with combined access and sensing functionality utilizing a wireless backhaul.
Figure 5:
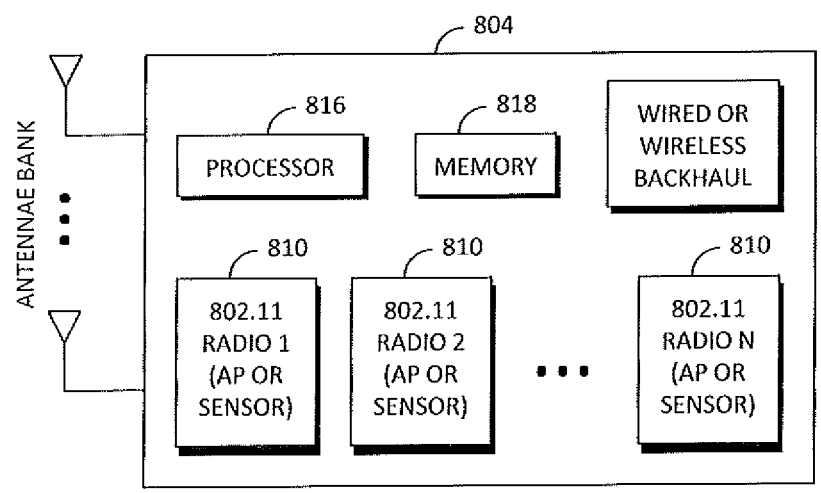
FIG. 5 is an AP/sensor device with combined access and sensing functionality and with three or more radios.

Referring to FIGS. 3-5, AP/sensor devices 800, 802, 804 are illustrated with combined access and sensing functionality according to an exemplary embodiment of the present invention. The AP/sensor device 800 of FIG. 3 is configured for a wired backhaul through a wired network 806. The AP/sensor device 802 of FIG. 4 is configured for a wireless backhaul through a wireless network. The AP/sensor device 804 of FIG. 5 can include either type of backhaul and includes more than two radios 810. The AP/sensor devices 800, 802, 804 are configured to communicate with the management platform 702 of FIG. 2 for WLAN infrastructure management and WIDS/WIPS functionality. Further, each of the AP/sensor devices 800, 802, 804 is configured to enable wireless devices (e.g., client device 606) access capability through the backhaul.

The AP/sensor devices 800, 802, 804 include two or more wireless radios 810 configured as access points or sensors. For example, the antennas on the wireless radios 810 are configured to receive and transmit wireless signals according to a predetermined protocol such as a variant of IEEE 802.11. The radios 810 can be configured as APs or as sensors. When configured as APs, the wireless radios 810 operate to transmit and receive wireless traffic as a wireless AP, and other wireless devices can connect to the wireless radios 810 and communicate through either an Ethernet 812 or wireless 814 backhaul connection to the wired network 806 or to a wireless network. Note, the AP/sensor devices 800, 802, 804 can utilize either type of backhaul connection 812, 814. When configured as a sensor, the wireless radios 810 monitor the wireless network only acting as a sensor device. The wireless radios 810 can be operated as APs in promiscuous mode in order to be undetectable from the airwaves and still read all IEEE 802.11 network traffic.

The AP/sensor devices 800, 802, 804 also include a processor 816 coupled to memory 818, the wireless radios 810, and the backhaul connection 812, 814. The processor 816 supports management, security collection, and security analysis functionality associated with the AP/sensor devices 800, 802, 804. The processor 816 can be any custom made or commercially available processor, a central processing unit (CPU), an auxiliary processor among several processors, a semiconductor-based microprocessor (in the form of a microchip or chip set), an application specific integrated circuit (ASIC), a field programmable gate array (FPGA), or generally any device for executing software instructions. When the AP/sensor devices 800, 802, 804 are in operation, the processor 816 is configured to execute software stored within the memory 818, to communicate data to and from the memory 818, and to generally control operations of the AP/sensor devices 800, 802, 804 pursuant to the software instructions. The processor 816 is configured to perform functionality related to both access and sensing.

The memory 818 is used to store data, such as configuration data, monitored data from the wireless radios 810, and the like. The memory 818 can include any of volatile memory elements (e.g., random access memory (RAM, such as DRAM, SRAM, SDRAM, etc.)), nonvolatile memory elements (e.g., ROM, hard drive, tape, CDROM, etc.), and combinations thereof. Moreover, the memory 818 can incorporate electronic, magnetic, optical, and/or other types of storage media. Note that the memory 818 can have a distributed architecture, where various components are situated remotely from one another, but can be accessed by the processor 816.

The backhaul connections 812, 814 are used to enable the AP/sensor devices 800, 802, 804 to communicate on a network, such as the wired network 806 or the wireless network 808. The backhaul connections 812, 814 can include, for example, an Ethernet card (e.g., 10BaseT, Fast Ethernet, Gigabit Ethernet) or a wireless local area network (WLAN) card (e.g., 802.11a/b/g/n or proprietary wireless protocol based mesh network) or a cellular data network (e.g., 3G or EvDO) access card. The backhaul connections 812, 814 can include address, control, and/or data connections to enable appropriate communications on the network. The backhaul connections 812, 814 are configured to perform functionality related to both access and sensing, i.e. communication to/from clients accessing the AP radios and communication to/from the management server for sensing. For the wireless backhaul connection 814, the AP/sensor devices 802 can be part of a wireless mesh network. Wireless backhaul connectivity can be provided through a separate radio, i.e. the wireless backhaul connection 812, which can leverage 802.11, 802.16, or other longer range wireless access protocols (e.g., cellular or point to point wireless links). In some instances, the AP radio itself may be multiplexed for wireless backhaul.

Additionally, the AP/sensor devices 800, 802, 804 include a connection to a power source such as an alternating current (AC) interface, direct current (DC) interface, power over Ethernet (PoE) compatible interface, or a repository for one or more disposable and/or rechargeable batteries. The various components in the AP/sensor devices 800, 802, 804 are housed in a single mechanical enclosure sharing the same power connection and backhaul connections 812, 814.

The AP/sensor devices 800, 802, 804 include software and/or firmware for operating as both an AP and a sensor. The sensor software embedded on the AP/sensor devices 800, 802, 804 is configured to read IEEE 802.11 frames from the wireless network and interrogate them to strip the management and control frames from the data frames, collect the data, store it in the memory 818, process the data frames, and communicate with a management server. The processor 816 can be configured to perform data processing on collected data prior to sending it to the management server to minimize network communications by performing distributed data analysis. The AP software embedded on the AP/sensor devices 800, 802, 804 is configured to operate the wireless radios 810 to provide access to wireless clients.

The AP/sensor devices 800, 802, 804 also include software embedded on the AP/sensor devices 800, 802, 804 for operating the cooperation algorithm between the AP and sensor wireless radios 810. This cooperation algorithm provides intelligent scanning between the wireless radios minimizing interference and the like. For example, the wireless radios 810 are not locked to any band, i.e. each can individually and concurrently operate on any channel in the 2.4 GHz or 5 GHz frequency band. The cooperation algorithm enables combined access and sensing functionality in the collocated wireless radios 810 by monitoring channel usage, adjusting transmission power, sensor radio frequency scanning patterns and the like based on the operating characteristics and scanning requirements of each of the wireless radios 810.

The AP/sensor device 804 of FIG. 5 illustrates a plurality of the wireless radios 810 in a single device. Of note, the AP/sensor device 804 can include a plurality of wireless radios 810 and each can be individually programmed to operate as either an AP or a wireless sensor. This can be done remotely, such as through the management server, and the functionality can change as needed. For example, during high usage periods, more of the wireless radios 810 can be configured to operate as APs. Conversely, during low usage periods, more of the wireless radios 810 can be configured to operate as sensors. Optionally, the wireless radios 810 can switch from AP to sensor based on a condition, such as detecting an intrusion or the like. Collectively, the wireless radios 810 are controlled by the processor 816 and the associated software, such as the cooperation algorithm. Further, this control can be provided from the management server as well through the backhaul connections 812, 814. The wireless radios 810 can be configured to operate on a channel, such as channels defined in IEEE 802.11. Multiple wireless radios 810, i.e. acting as either a sensor or AP, can be on the same channel. The cooperation algorithm is configured to provide the desensitization only when the sensor is trying to receive on a channel that is adjacent to the APs transmission.

When in operation as a sensor, the wireless radios 810 can perform a variety of functions in addition to monitoring transmitted frames. For example, the sensor can request an in-service AP to send wireless termination packets to a rogue device that is operating on the same channel as the AP. This allows the sensor to continue scanning across frequencies to search for other threats and issues. Alternatively, the sensor can request that the AP block the wired network access of a suspicious device connected to the AP. Further, the sensor can transmit the wireless termination packets itself.

Additionally, the sensor can provide remote testing capability of remote APs. For example, remote testing of APs is described in commonly assigned U.S. patent application Ser. No. 12/410,967 filed Mar. 25, 2009 and entitled "SYSTEMS AND METHODS FOR REMOTE TESTING OF WIRELESS LAN ACCESS POINTS," the contents of which are incorporated by reference herein. Specifically, the remote testing can include a distributed network of WLAN sensors that typically operate to monitor the WLAN, and as needed, the WLAN sensors are converted to WLAN clients capable to connecting and remotely testing one or more WLAN APs. For example, the testing can include layer two and layer three related connectivity tests.

Figure 6:
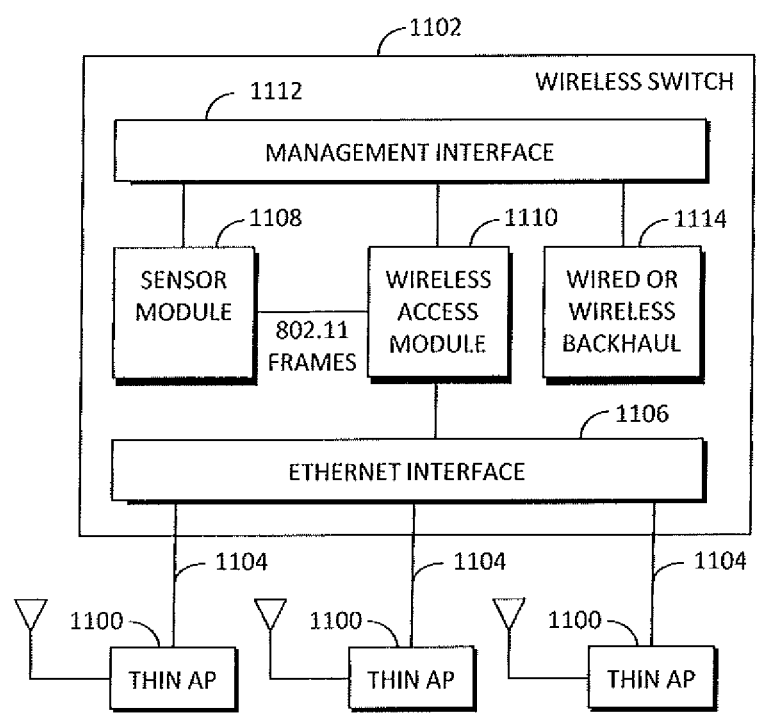
FIG. 6 is a wireless switch with a plurality of thin AP/sensor devices where packet level processing has been migrated to the switch.

Referring to FIG. 6, a plurality of thin AP/sensors 1100 are illustrated where packet level processing has been migrated to a switch 1102 according to an exemplary embodiment of the present invention. The thin AP/sensors 1100 can include a similar architecture as the AP/sensor devices 800, 802, 804. The thin AP/sensors 1100 are referred to as "thin" because the associated wireless radios 810 on the thin AP/sensors 1100 do minimal frame processing. Instead, the thin AP/sensors 1100 simply behave as a wireless antenna port, forwarding received frames to the switch 1102 over a network interface 1104 (such as an Ethernet network). The switch 1102 includes an Ethernet interface 1106 that connects to each of the thin AP/sensors 1100. For example, the switch 1102 can be co-located with the thin AP/sensors 1100 in a building or campus. Alternatively, the switch 1102 can be geographically diverse. The switch 1102 handles the bulk of the frame processing.

The switch 1102 includes a sensor module 1108, a wireless access module 1110, a management interface 1112, and a wired or wireless backhaul interface 1114. Collectively, these components 1108, 1110, 1112, 1114 provide similar functionality as described herein with respect to the AP/sensor devices 800, 802, 804. The Ethernet interface 1106 includes multiple Ethernet ports, i.e. at least enough ports to support all of the plurality of thin AP/sensors 1100. These ports can include 10BaseT, Fast Ethernet, Gigabit Ethernet, and the like. The Ethernet interface 1106 is connected to the sensor module 1108 and the wireless access module 1110 to provide frames from the plurality of thin AP/sensor devices to these modules 1108, 1110 for processing of the frames. The wireless access module 1110 is configured to process frames for the Ethernet interface 1106 and to communicate the frames with the management interface 1112 and the backhaul 1114. This processing by the wireless access module 1110 relates to the access point functionality.

The sensor module 1108 is configured to process frames for the Ethernet interface 1106 and to communicate processed data with the management interface 1112 and the backhaul 1114. This processing by the sensor module 1108 relates to the WIDS/WIPS functionality. The management interface 1112 provides overall control of the wireless switch 1102 and communication to/from the sensor module 1108 and the wireless access module 1110. The management interface 1112 further communicates with the wired or wireless backhaul 1114. The backhaul 1114 provides similar functionality as the backhaul connections 812, 814.

In this model of thin AP/sensor devices 1100, the AP and sensor software is resident on the wireless switch 1102. The sensor module 1108 gets a "feed" from the wireless access module 1110, i.e. the feed includes a stream of data of some or all of the data from the Ethernet interface 1106 to the wireless access module 1110. For example, the wireless access module 1110 can provide a copy of every frame it receives to the sensor module 1108. Alternatively, the two modules 1108, 1110 can have an interface to exchange frame summary information and statistics. Here, the wireless access module 1110 can perform some processing on the frames to determine relevancy related to WIDS/WIPS, and if so, transmit them to the sensor module 1108. The sensor module 1108 interacts with the wireless access module 1110 to initiate sensor wireless transmission (e.g. during wireless termination through various mechanisms known in the art). The sensor module 1108 also communicates to the management server via the management interface 1112 and the wired or wireless connection backhaul 1114 to the rest of the network. The sensor module 1108 can request an in-service AP to send wireless termination packets to a rogue device that is operating on the same channel as the AP.

A management server can have a WLAN management component and a WIPS/WIDS component according to an exemplary embodiment of the present invention. The management server can be a digital computer that, in terms of hardware architecture, generally includes a processor, input/output (I/O) interfaces, a network interface, a data store, and memory. The components are communicatively coupled via a local interface. The local interface can be, for example but not limited to, one or more buses or other wired or wireless connections, as is known in the art. The local interface can have additional elements, which are omitted for simplicity, such as controllers, buffers (caches), drivers, repeaters, and receivers, among many others, to enable communications. Further, the local interface can include address, control, and/or data connections to enable appropriate communications among the aforementioned components.

The processor is a hardware device for executing software instructions. The processor can be any custom made or commercially available processor, a central processing unit (CPU), an auxiliary processor among several processors associated with the server, a semiconductor-based microprocessor (in the form of a microchip or chip set), or generally any device for executing software instructions. When the server is in operation, the processor is configured to execute software stored within the memory, to communicate data to and from the memory, and to generally control operations of the server pursuant to the software instructions.

The I/O interfaces can be used to receive user input from and/or for providing system output to one or more devices or components. User input can be provided via, for example, a keyboard and/or a mouse. System output can be provided via a display device and a printer (not shown). I/O interfaces can include, for example, a serial port, a parallel port, a small computer system interface (SCSI), an infrared (IR) interface, a radio frequency (RF) interface, and/or a universal serial bus (USB) interface. The network interfaces can be used to enable the server to communicate on a network. The network interfaces can include, for example, an Ethernet card (e.g., 10BaseT, Fast Ethernet, Gigabit Ethernet) or a wireless local area network (WLAN) card (e.g., 802.11a/b/g). The network interfaces 1230 can include address, control, and/or data connections to enable appropriate communications on the network. The network interfaces are utilized to communicate with the AP/sensor devices 800, 802, 804, the switch 1102, and the like.

The data store can be used to store alarms, events, data, state, and statistics that the server receives or analyzes from AP/sensor devices monitoring or managing a wireless network. The data store can include any of volatile memory elements (e.g., random access memory (RAM, such as DRAM, SRAM, SDRAM, etc.)), nonvolatile memory elements (e.g., ROM, hard drive, tape, CDROM, etc.), and combinations thereof. Moreover, the data store can incorporate electronic, magnetic, optical, and/or other types of storage media. In one example, the data store can be located internal to the server such as, for example, an internal hard drive connected to the local interface in the server. Additionally in another embodiment, a data store can be located external to the server such as, for example, an external hard drive connected to the I/O interfaces (e.g., SCSI or USB connection). Finally in a third embodiment, a data store may be connected to the server through a network, such as, for example, a network attached file server or the like.

The memory can include any of volatile memory elements (e.g., random access memory (RAM, such as DRAM, SRAM, SDRAM, etc.)), nonvolatile memory elements (e.g., ROM, hard drive, tape, CDROM, etc.), and combinations thereof. Moreover, the memory can incorporate electronic, magnetic, optical, and/or other types of storage media. Note that the memory can have a distributed architecture, where various components are situated remotely from one another, but can be accessed by the processor.

The software in memory can include one or more software programs, each of which includes an ordered listing of executable instructions for implementing logical functions. The software in the memory system includes the WLAN management component, the WIPS/WIDS component, and a suitable operating system (O/S). The operating system essentially controls the execution of other computer programs, such as the WLAN management component and the WIPS/WIDS component, and provides scheduling, input-output control, file and data management, memory management, and communication control and related services. The operating system can be any of Windows NT, Windows 2000, Windows XP, Windows Vista (all available from Microsoft, Corp. of Redmond, Wash.), Solaris (available from Sun Microsystems, Inc. of Palo Alto, Calif.), LINUX (or another UNIX variant) (such as available from RedHat of Raleigh, N.C.), or the like.

The WLAN management component is configured to provide WLAN management of a plurality of APs, thin APs, sensors, AP/sensor devices, thin AP/sensor devices, and the like forming the WLAN infrastructure. Such management can include WLAN infrastructure configuration, wireless planning, visual network views, comprehensive reporting, alarming, performance monitoring, and the like. Additionally, the WLAN management component can enable setting of various configured properties or policies for the APs. The following table provides a summary of various AP properties displayable or configurable through the WLAN management component.

| Values | Description |
| --- | --- |
| Access Point ID | The MAC address of the access point. |
| Access Point Name | The user-defined name of the access point. |
| Extended Service Set ID | The name of the Extended Service Set indicating the wireless network to which the access point belongs. |
| Access Point Vendor | The manufacturer of the access point. In some embodiments, this is detected by comparing the first three bytes of its MAC address with a database of OUI numbers. |
| Supported Rates | The data transfer rates the access point supports. In some embodiments, this value (or these values) can be edited to specify the supported rates. |
| Authentication Modes | Whether the access point accepts non-authenticated network connections and/or also accepts shared key authentication. (If connections are detected that deviate from either of these settings, an alarm can be generated.) |
| Encryption Modes | Whether or not the access point is configured to require WEP, WPA or WPA2. |

-continued

| Values | Description |
| --- | --- |
| AP Mgmt From Wireless Network | Whether the access point is configured to allow users to directly administer its settings over the wireless network. |
| Authorized Access Point | Whether this access point is authorized to be present in the air space. Unauthorized access points, when detected, can generate alarms. (In some embodiment, a change in this value will not take effect until the system is restarted.) |

The WLAN management component can display a station maintenance screen or menu WLAN management component. An exemplary embodiment of such a screen or menu, automatically detects all stations within the footprint of the access point's Basic Service Set (BSS) and enters their MAC addresses in an Observed column. Such stations can be indicated as an authorized member of the BSS by selecting them in the Observed column and designating them as Valid. Designated stations are moved to a Valid column. (Stations can, in some embodiments, be designated as invalid by selecting and marking them in the Valid column.) Stations not auto-detected can be manually entered by specifying its MAC address in a Enter New Station input field and triggering an Add Station feature.

The WIPS/WIDS component is configured to provide wireless intrusion detection and/or prevention support. These functions can include gathering data related to wireless frame transmissions on the network, correlating the data, utilizing the correlated data to detect intrusion based on one or more intrusion detection tests (e.g., signature-based testing, protocol-based testing, anomaly-based testing, and policy deviation-based testing), preventing intrusions through one or more prevention mechanisms, and the like. These one or more prevention mechanisms can include: 1) transmitting a signal via the wireless transmitter to jam communications targeted at the potentially compromised access point; 2) transmitting a signal via the wireless transmitter to corrupt communications targeted at the potentially compromised access point by introducing CRC errors; 3) transmitting a signal via the wireless transmitter to increase difficulty associated with breaking of encryption associated with the wireless computer network and the potentially compromised access point, wherein the signal includes packets emulating legitimate traffic but with randomized payloads; 4) transmitting a channel change request communication via the wireless transmitter to the potentially compromised access point; or 5) blocking wired side access by suppressing a switch port or setting up an Access control List (ACL) for a rogue wireless device.

An additional aspect of the WIPS/WIDS component can include gathering and monitoring various statistics related to operation of the wireless network. These statistics can be utilized in the WIPS/WIDS process to detect anomalous behavior or rogue devices. For example, the WIPS/WIDS component can enable various thresholds associated with these statistics. These thresholds can be predetermined or user-settable through the server. Exemplary thresholds associated with APs can include:

| Column | Description |
| --- | --- |
| Signal Strength Threshold | If the signal strength for any frame is lower than this value, an alarm can be generated. |
| # of Associations per Minute | Whereas stations must associate with an access point, access points do not associate with themselves. Therefore, this value should be zero, indicating that it does not associate. |
| # of Bytes Transmitted | Enter the maximum number of bytes of data per minute this access point is allowed to transmit. If a greater number is detected, an alarm can be generated. |
| # of Bytes Received | Enter the maximum number of bytes of data per minute this access point is allowed to receive. If a greater number is detected, an alarm can be generated. |
| # of Data Frames Transmitted | Enter the maximum number of data frames per minute this access point is allowed to transmit. If a greater number is detected, an alarm can be generated. |
| # of Data Frames Received | Enter the maximum number of data frames per minute this access point is allowed to receive. If a greater number is detected, an alarm can be generated. |
| # of Mgmt Frames Transmitted | Enter the maximum number of management frames per minute this access point is allowed to transmit. If a greater number is detected, an alarm can be generated. |
| # of Mgmt Frames Received | Enter the maximum number of management frames per minute this access point is allowed to receive. If a greater number is detected, an alarm can be generated. |
| # of Ctrl Frames Transmitted | Enter the maximum number of control frames per minute this access point is allowed to transmit. If a greater number is detected, an alarm can be generated. |
| # of Ctrl Frames Received | Enter the maximum number of control frames per minute this access point is allowed to receive. If a greater number is detected, an alarm can be generated. |
| # of Fragment Frames Seen | Enter the maximum number of fragment frames per minute this access point can see before generating an alarm. |
| # of Decrypt Error Frames Seen | Enter the maximum number of decrypt error frames per minute this access point can see before generating an alarm. |

Exemplary thresholds associated with individual wireless clients or stations can include:

| Column | Description |
| --- | --- |
| Signal Strength Threshold | If the signal strength for any station associated with an unknown access point is lower than this value, an alarm can be generated. |
| # of Associations per Minute | Enter the maximum number of associations per minute any station is allowed to make with an unknown access point. If a greater number is detected, an alarm can be generated. |
| # of Bytes Transmitted | Enter the maximum number of bytes of data per minute any station is allowed transmit through unknown access points. If a greater number is detected, an alarm can be generated. |
| # of Bytes Received | Enter the maximum number of bytes of data per minute any station is allowed to receive through unknown access points. If a greater number is detected, an alarm can be generated. |
| # of Data Frames Transmitted | Enter the maximum number of data frames per minute any station is allowed to transmit through unknown access points. If a greater number is detected, an alarm can be generated. |
| # of Data Frames Received | Enter the maximum number of data frames per minute any station is allowed to receive through unknown access points. If a greater number is detected, an alarm can be generated. |
| # of Mgmt Frames Transmitted | Enter the maximum number of management frames per minute any station is allowed to transmit through unknown access points. If a greater number is detected, an alarm can be generated. |
| # of Mgmt Frames Received | Enter the maximum number of management frames per minute any station is allowed to receive through unknown access points. If a greater number is detected, an alarm can be generated. |
| # of Ctrl Frames Transmitted | Enter the maximum number of control frames per minute any station is allowed to transmit through unknown access points. If a greater number is detected, an alarm can be generated. |
| # of Ctrl Frames Received | Enter the maximum number of control frames per minute any station is allowed to receive through unknown access points. If a greater number is detected, an alarm can be generated. |
| # of Fragment Frames Seen | Enter the maximum number of fragment frames per minute from any station that are allowed. If a greater number is detected, an alarm can be generated. |
| # of Decrypt Error Frames Seen | Enter the maximum number of decrypt error frames per minute from any station that are allowed. If a greater number is detected, an alarm can be generated. |

The foregoing thresholds are shown for illustration purposes. Those of ordinary skill in the art will recognize additional thresholds could be included based on any of the parameters that are monitored by the WIPS/WIDS component. Advantageously, these thresholds enable the WIPS/WIDS component to detect not only rogue devices, but also authorized devices displaying anomalous behavior.

The WIPS/WIDS component performs vulnerability assessment by analyzing WLAN traffic, discovering access points and wireless clients. The WIPS/WIDS component determines how many bytes of data stations are sending and receiving, the mean signal strength for an entire day or the hi/low signal strength for each minute. It can distinguish between network traffic internal to the wireless network and traffic originating from or destined to the physical, wired-network and which stations are the largest senders and receivers of data. The WIPS/WIDS component produces broad summaries of data that report high, low, and mean values for a variety of traffic parameters, and detailed views that show minute-by-minute snapshots of your traffic. Traffic parameters include the breakdown of frame traffic (control, management, data, and error frames) and network routing information. The WIPS/WIDS component determines if any traffic has not been encrypted, users are authenticated, and all hardware is properly configured. The WIPS/WIDS component detects rogue deployments by identifying and locating unauthorized WLANs and ad hoc networks (peer-to-peer networks) that violate policy and jeopardize security. The WIPS/WIDS component identifies suspicious WLAN traffic across unauthorized channels and frequencies, which can be a common sign of intruders accessing your WLAN or employees abusing their network privileges.

In another exemplary embodiment, the management server in conjunction with the AP/sensor devices 800, 802, 804, the switch 1102, and the like can be utilized to provide enhanced visibility of the WLAN infrastructure. For example, the accuracy of physical location tracking of wireless devices that rely on signal strength triangulation or fingerprinting can be improved by aggregating data from AP and sensor wireless radios 1110. This location tracking mechanism can use the sensor-based monitoring infrastructure in the wireless radios 1110 along with the AP WLAN infrastructure in the wireless radios 1110 to derive estimates of position based upon received signal characteristics. In pre-configured mode, a static list of device identifiers representing one or more objects to be tracked can be maintained within the system data store. In adaptive mode, the list of devices can be dynamically developed from an empty list or from a pre-configured static list. In some embodiments including an adaptive mode, a pre-configured static list can be provided that cannot be altered in adaptive mode; while in others, the objects in a pre-configured static list can be removed and/or modified just as objects dynamically added to the list of objects to be tracked.

A monitoring process utilizes the AP/sensor devices 800, 802, 804, the thin AP/sensor devices 1100 with the switch 1102, and the like for monitoring WLAN infrastructure according to an exemplary embodiment of the present invention. After initialization, a primary network scan occurs according to a predetermined scan pattern. The predetermined scan pattern can include a scan of certain or all channels of the wireless network. For example, certain channels can be scanned more often based on usage history as determined through the statistics collected by the server. Also, certain channels can be scanned more often based on risk history as determined through the statistics collected by the server. A background scan can occur after each primary network scan. Alternatively, as depicted, a background scan can only occur based upon a particular trigger condition such as random determination, after a certain number of primary scan or after a certain time period has passed.

A decision as to whether the particular condition to trigger a background scan has occurred is made. The background scan occurs. A determination is then made as to whether an unauthorized device has been detected during the background scan. If not, processing continues with a primary network scan. If a device was detected, the scan pattern for the primary network is adapted. This modified scan pattern is then used for scanning the wireless channels. As above, background scans can occur after each such modified scan, or as depicted, can occur according to a trigger condition. A determination if fewer unauthorized devices were identified in the modified scan is made. If so, a determination is then made as to whether any unauthorized devices are still being detected. If no unauthorized devices are still being detected, the scan pattern is reset to the predetermined original scan pattern and processing continues with a primary scan. If some unauthorized devices are still being detected, the scan pattern is modified accordingly and processing continues.

If fewer devices were not found, a determination is made as to whether a background scan should occur. If not, processing continues with a further modified scan. If so, the background scan occurs. A determination is made as to whether a previously unidentified unauthorized device has been detected. If so, the scan pattern is modified accordingly and processing continues. If not, the processing continues. Those skilled in the art will readily appreciate that the described process is exemplary and that the steps described need not occur in the exact order described but can proceed logically in other apparent orderings. For instance, the background scan determination loop in the modified scan portion of the flow could as readily occur before the fewer device determination step as after. Additional order alterations should be apparent and are contemplated within the scope of the present invention. Further, enhanced embodiments can utilize multi-channel receivers in which adaptive scanning can occur uniquely per receiver. This allows, for example, multiple channels or multiple frequency bands to be scanned and monitored in parallel.

In some embodiments, the scanning of air waves for network activity can be adaptive in nature. In a typical configuration, wireless network channels are scanned for activity according to a predefined pattern. According to an adaptive approach, the predefined pattern can serve as an initial and/or baseline pattern. This pattern can then be adapted based upon actual activity in the scanned channels. This mechanism allows the system to deterministically scan all wireless channels through time-based multiplexing while also allowing the system to adaptively adjust the time spent on a given channel based on current and past activity. A typical scenario would be to monitor a fixed set of channels and periodically perform a background scan of the remaining channels. If any activity is observed on a channel expected to be idle or unauthorized activity is discovered, the system adapts by adding this channel to its primary scanning pattern. If activity then diminishes, this channel will be removed from the primary scanning pattern and then scanned next during the background scanning mode. The system can utilize either pre-configured thresholds or user-entered thresholds to determine the trigger point at which to start or stop dynamic monitoring of the channel. Additionally, automated controls can be included that will lock onto the channel if a security violation has been detected per the underlying multi-dimensional analysis engine.

Two or more collocated radios are operated according to an exemplary embodiment of the present invention. This can include any of the AP/sensor devices 800, 802, 804, the thin AP/sensor device 1100, and the like. Each of the collocated radios is designated as a particular type. The exemplary types can include access point, sensor, and backhaul. A scanning pattern is determined. The scanning pattern determines how each sensor monitors a wireless network, i.e. which channels and for how long on each channel. Of note, the scanning pattern can be determined based on channel usage, risk assessment, and the like.

The scanning pattern is adapted based on the other collocated radios. This adaptation ensures that sensor and AP functions are coordinated to minimize the impact of mutual radio desensitization when one radio is transmitting and the other is receiving a frame on a channel that is in close frequency proximity. APs typically transmit much more frequently than sensors. When the AP is transmitting on a given channel, the sensor radio can be desensitized by the high powered transit signal emanating in close proximity to the sensors radio. The desensitization progressively reduces as the frequency separation between the two radios is increased. By adaptively adjusting the frequency scanning pattern to avoid AP channel proximity, while the AP is transmitting, the sensor can minimize the loss of frame reception. Similarly, when the sensor is transmitting (e.g., during a wireless termination), the AP may attempt to synchronize its transmissions at the same time as the sensor to avoid transmit-receive desensitization. Alternatively, this adaptation can include changing the predetermined scanning pattern responsive to emerging risks and recent channel usage. The various radio types can be adjusted as needed. For example, more radios can be used as access points during high bandwidth periods and changed to sensors during low bandwidth periods. If the radios are changed, then a new designation is provided. If not, the radios continue to operate.

Although the present invention has been illustrated and described herein with reference to preferred embodiments and specific examples thereof, it will be readily apparent to those of ordinary skill in the art that other embodiments and examples may perform similar functions and/or achieve like results. All such equivalent embodiments and examples are within the spirit and scope of the present invention and are intended to be covered by the following claims.

What is claimed is:

1. An access point and sensor device in a wireless local area network system, comprising:
   a plurality of collocated wireless radios operable as either an access point in a wireless device;
   or as a wireless sensor for detecting a network intruder;
   a processor coupled to the wireless radios and a memory; and
   a frequency scanning pattern of a wireless radio operable as a wireless sensor stored in the memory to be used by the processor to adaptively adjust the frequency scanning pattern of the wireless radio operable as a wireless sensor to avoid an operating frequency in proximity to a channel used by a wireless radio operable as an access point for transmitting.

2. The access point and sensor device of claim 1, wherein some of the wireless radios are operable to change functionality between being an access point and a sensor, and wherein more of the wireless radios are configurable to operate as access points than sensors during higher network usage and wherein more of the wireless radios are configurable to operate as sensors than access points during lower network usage.

3. The access point and sensor device of claim 1, wherein upon detection of an intrusion by the wireless sensor at least one of the wireless radios operable as an access point is converted to operate as a wireless sensor.

4. The access point and sensor device of claim 1, wherein the processor is configured to determine how long each channel of the frequency scanning pattern is monitored by the wireless sensor based on risk assessment.

5. The access point and sensor device of claim 1, wherein the processor is configured to adaptively synchronize access point functionality transmissions at a same time as the sensor functionality to avoid transmit-receive desensitization.

6. The access point and sensor device of claim 1, wherein the processor is configured to periodically change the functionality of a wireless radio from an access point to a wireless sensor when that wireless radio is not providing wireless access to the wireless network.

7. The access point and sensor device of claim 1, wherein upon detecting a network intruder, the device operates to terminate the network intruder communications by at least one of jamming communications and corrupting communications, introducing CRC errors, and transmitting a channel change request.

8. The access point and sensor device of claim 1, wherein upon detecting a network intruder, the device operates to terminate the network intruder communications by at least one of introducing CRC errors, and transmitting a channel change request.

9. A wireless local area network system, comprising:
two or more collocated wireless radios within a wireless device, wherein each of the two or more collocated wireless radios are configurable as either an access point for wireless the local area network or as a wireless sensor operable for detecting a network intruder;
a processor connected to the two or more wireless radios, wherein the processor is configured to control a wireless radio operable as a wireless sensor to adaptively adjust a frequency scanning pattern of the wireless radio operable as the wireless sensor to avoid an operating frequency in proximity to a channel used by a wireless radio operable as an access point for transmitting.

10. The wireless network system of claim 9, wherein the processor is further configured to synchronize access point transmission with sensor reception.

11. The wireless network system of claim 9, wherein the processor is further configured to perform packet level processing of data from the wireless sensor to determine if a known attack signature stored in a memory of the processor can been identified in the data indicating an intrusion.

12. The wireless network system of claim 9, wherein the processor is further configured to perform packet level processing of data from the wireless sensor to determine if a number of association and disassociation requests for a defined time interval exceeds a predetermined protocol threshold indicating an intrusion.

13. The wireless network system of claim 9, wherein the processor is further configured to perform packet level processing of data from the wireless sensor to provide a normalized statistics of activities in each channel, where an intrusion is indicated if the normalized statistics exceed a predetermined threshold.

14. The wireless network system of claim 9, wherein the processor is further configured to perform packet level processing of data from the wireless sensor to observe activity in each channel, where an intrusion is indicated if the activity violates a stored activity rule.

15. The wireless network system of claim 13, wherein the processor is configured to apply multiple intrusion detection tests to data received by the sensor, the tests including signature-based testing, protocol-based testing, anomaly-based testing, and policy deviation-based testing, wherein the results of all of these tests are compared to a predefined confidence level to determine an intruder alert.

16. A method of concurrent wireless local area network access and sensing, comprising:
operating two or more collocated radios in a wireless device, wherein each of the two or more collocated radios are configurable as either an access point for wireless the local area network or as a wireless sensor operable for detecting a network intruder; and
adapting a frequency scanning pattern of the wireless radio operable as the wireless sensor for avoiding an operating frequency in proximity to a channel used by a wireless radio operable as an access point for transmitting.

17. The method of concurrent wireless local area network access and sensing of claim 16, further comprising:
responsive to the wireless sensor transmitting, synchronizing transmissions of the access point to the wireless sensor reception.

18. The method of concurrent wireless local area network access and sensing of claim 17, wherein synchronizing is also performed in response to channel usage and transmission power.

19. The method of concurrent wireless local area network access and sensing of claim 16, further comprising:
scanning a plurality of channels with the wireless sensor in accordance with the frequency scanning pattern; and
adapting how long each channel of the frequency scanning pattern is monitored responsive to a risk history associated with each channel.

20. The method of concurrent wireless local area network access and sensing of claim 16, further comprising:
changing functionality of the wireless radios between being an access point and a sensor, wherein more of the wireless radios are configurable to operate as access points than sensors during higher bandwidth periods and wherein more of the wireless radios are configurable to operate as sensors than access points during lower bandwidth periods.

* * * * *